United States Patent [19]
Burger

[11] 3,947,777
[45] Mar. 30, 1976

[54] CIRCUIT ARRANGEMENT FOR THE DEMODULATION OF A PHASE-MODULATED SIGNAL

[75] Inventor: Erich Burger, Unterpfaffenhofen, Germany

[73] Assignee: Siemens Aktiengesellschaft, Berlin & Munich, Germany

[22] Filed: Mar. 19, 1974

[21] Appl. No.: 452,540

[30] Foreign Application Priority Data
Mar. 27, 1973 Germany............................ 2315206

[52] U.S. Cl. ................: 329/122; 307/232; 328/134; 328/109; 325/346; 329/122
[51] Int. Cl.² .......................................... H03D 3/06
[58] Field of Search .......................... 329/122–126, 329/50; 328/109–113, 133, 134; 325/346, 349; 307/232

[56] References Cited
UNITED STATES PATENTS

| | | | |
|---|---|---|---|
| 2,937,273 | 5/1960 | Franco | 329/50 X |
| 3,482,174 | 12/1969 | James | 329/50 X |

Primary Examiner—Alfred L. Brody

[57] ABSTRACT

Apparatus for demodulating phase modulated signals is described. The latter signals are produced by modulation of a carrier or harmonically related carriers. The modulated signal, constituted by consecutive modulation sections, is coupled to an analogue multiplier, the output of which is connected to an integrator. The integrator produces the demodulated signal. A pulse generator produces a sequence of pulses, each of which occurs within a given modulation section. The duration of each pulse equals the reciprocal of the fundamental frequency. A carrier corresponding in frequency and synchronized with the transmitted carrier is produced in the receiver. The transmitted carrier and receiver-produced carrier are coupled to the multiplier. The latter carrier is switched prior to its application to the multiplier using the output of the pulse generator.

7 Claims, 7 Drawing Figures

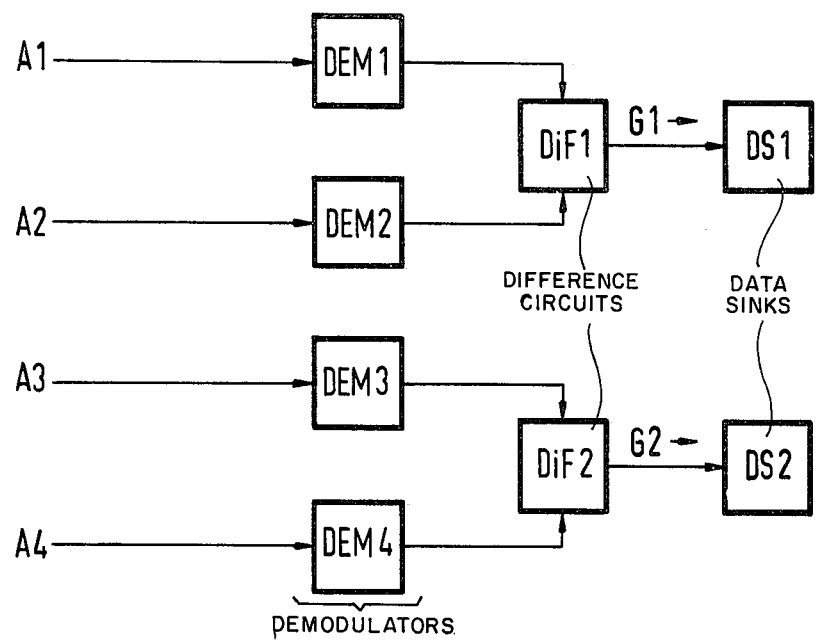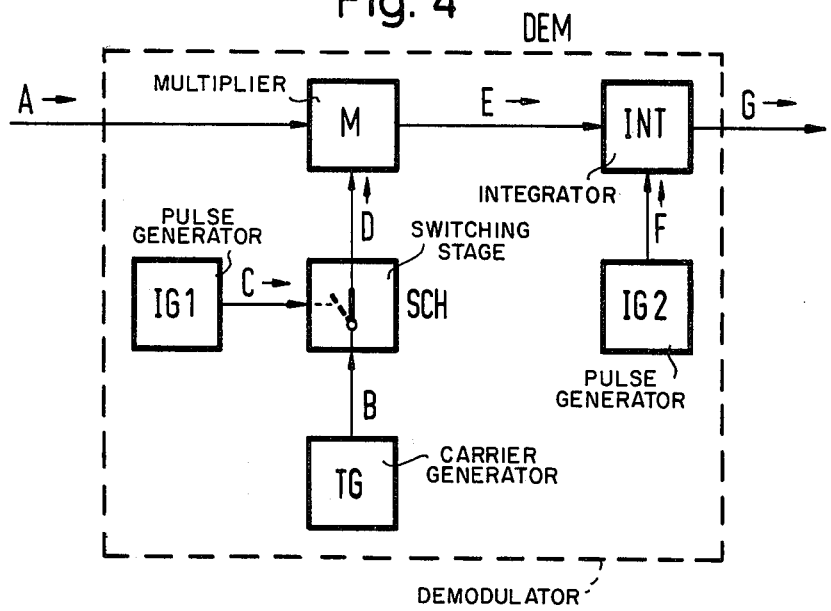

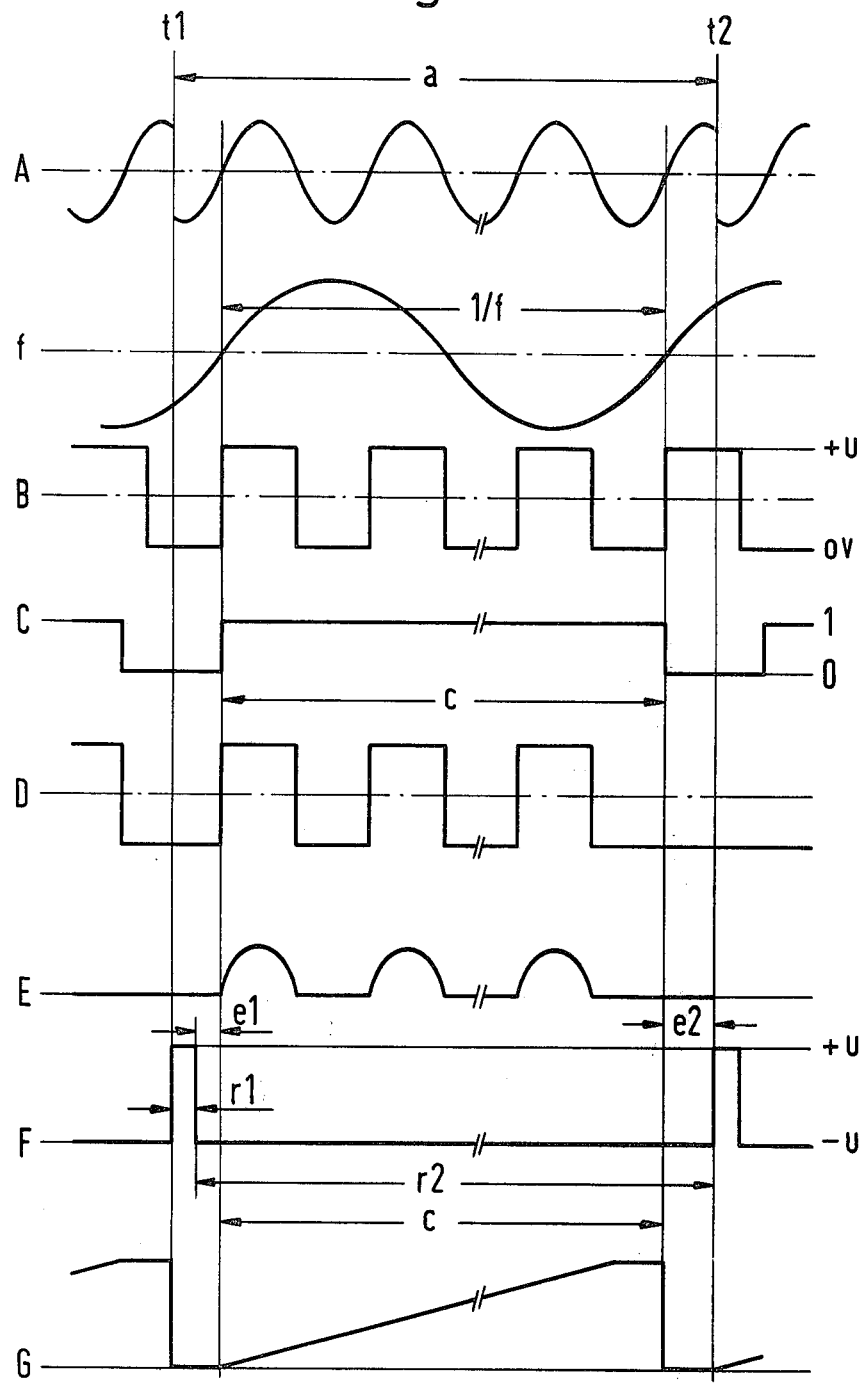

CIRCUIT ARRANGEMENT FOR THE DEMODULATION OF A PHASE-MODULATED SIGNAL

BACKGROUND OF THE INVENTION

The invention relates to a circuit arrangement for the demodulation of a phase modulated signal which is obtained by the modulation of one or a plurality of carriers, the frequencies of which are multiples of a fundamental frequency. The signal consists of consecutive modulation sections and is conducted to an analogue multiplier. An integrator is also provided which is supplied with the output signal of the multiplier and which emits a demodulated signal.

In a known circuit arrangement for the demodulation of a phase modulated signal this phase modulated signal is conducted to a multiplier and a multiplicative signal is obtained which corresponds to the multiplication of the phase modulated signal with the carrier. This multiplicative signal is conducted to an integrator, from the output of which the demodulated signal is emitted. In order to use for integration only those parts of the multiplicative signal which are not affected by any phase shifts in the phase modulated signal, either in the transmission path between the multiplier and the integrator or within the integrator, there is provided an analogue switch which allows response to only those parts of the multiplicative signal which are unaffected by phase shifts in the phase modulated signal. Thus, undesired parts of the multiplicative signal are suppressed using this type of analogue switch. For example, an analogue switch of this type can be composed of a plurality of transistor stages.

The known circuit arrangement for the demodulation of a phase modulated signal possesses the disadvantage of a lack of temperature stability because the analogue switch, which consists of a plurality of transistor stages, displays differing swtiching behavior at different temperatures. This type of analogue switch itself necessitates a relatively large financial outlay for the circuitry, which increases in accordance with the requisite temperature stability of the analogue switch. In spite of this high outlay it is not possible to prevent signal distortions which arise as a result of the use of the described analogue switch.

An object of the invention is to provide a circuit arrangement for the demodulation of a phase modulated signal which is distinguished by a good temperature stability and a low circuitry cost.

SUMMARY OF THE INVENTION

In accordance with the invention the aforementioned and other objects are achieved in a circuit arrangement of the type described hereinabove, there is provided a pulse generator which produces a sequence of rectangular wave form pulses. Each of the latter pulses occurs during one modulation section, and the duration of each pulse is equal to a reciprocal of the fundamental frequency. The transmission path, across which a multiplier is connected, contains a switching stage which is controlled with the rectangular wave form pulses. Also, using the multiplier, as a result of the multiplication of the phase modulated signal with the signal which is allowed to pass through the switching stage, a multiplicative signal is produced and conducted to the integrator.

The circuit arrangement is characterized in that those parts of the multiplicative signal which are to be integrated are not selected, by means of a limited integration time, but in that using the switching stage, only those parts of the multiplicative signal which are subsequently also integrated are in fact produced. Thus, the circuit arrangement in accordance with the invention obviates the use of an analogue switch in the transmission path between the multiplier and the integrator. The outlay required for the switching stage is considerably lower than for the analogue switch, because the use of the analogue switch in the known circuit arrangement necessitates the connection of a relatively complex signal. In contrast in the circuit arrangement in accordance with the invention only a relatively simple shaped rectangular or sinusoidal carrier must be connected. In this type of switching stage, while maintaining a low outlay for circuitry, it is also possible to achieve a good temperature stability so that signal distortions such as occur with the use of the known circuit arrangement are substantially avoided.

If a particularly low cost together with tolerable temperature stability is required, it is desirable to provide the multiplier in the form of two parallel connected, complementary transistors which act as double current switches. By chopping the phase modulated signal with a rectangular carrier, a multiplicative signal is produced which corresponds to the produce of the phase modulated signal and of the carrier.

If a particularly great temperature stability together with a tolerable outlay is to be achieved, it is desirable to provide the multiplier in the form of two field effect transistors which act as current switches. These two field effect transistors are controlled with the phase-modulated signal and with the carrier, so that, via the output of the multiplier, a multiplicative signal is again emitted to the following integrator.

BRIEF DESCRIPTION OF THE DRAWINGS

Exemplary, but preferred, embodiments of the invention will be described in the following making reference to FIGS. 1 to 7; identical objects appearing in more than one figure have been marked with the same references.

FIG. 3 is a block circuit diagram of a circuit arrangement for frequency-differential phase modulation.

FIG. 4 is a block circuit diagram of a circuit arrangement for the demodulation of a phase-modulated signal in a fundamental illustration.

FIG. 5 illustrates signals which occur in the region of the demodulator shown in FIG. 2.

DETAILED DESCRIPTION OF THE DRAWINGS

Figure 1:
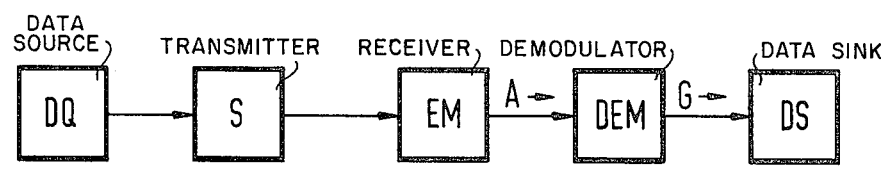
FIG. 1 is a block circuit diagram of a data transmission system for phase modulated signals.

In accordance with FIG. 1, from a data source DQ, data are emitted to a transmitter S from which a phase-modulated signal is transmitted to a receiver EM. The receiver EM amplifies the received signal and emits a phase-modulated signal A to a demodulator DEM. From the demodulator DEM the modulated signal G is fed to a data sink DS. The data sink DS can, for example, take the form of a teleprinter, a data viewing device, or a data processing system.

In the transmitter S there could be produced a sinusoidal carrier, the phase of which is varied at intervals of modulation sections so that a phase-modulated signal is conducted to the receiver EM. In most cases the phase-modulated signal which is transmitted from the transmitter S to the receiver EM is obtained by the modulation of a plurality of carriers, the frequencies of which are multiples of a fundamental frequency. For example, the phase modulated signal can have been formed by the modulation of 16 different carriers. The receiver EM is thus supplied with a signal mixture which it amplifies, so that also as phase modulated signal A a signal mixture is fed to the demodulator DEM.

Figure 2:
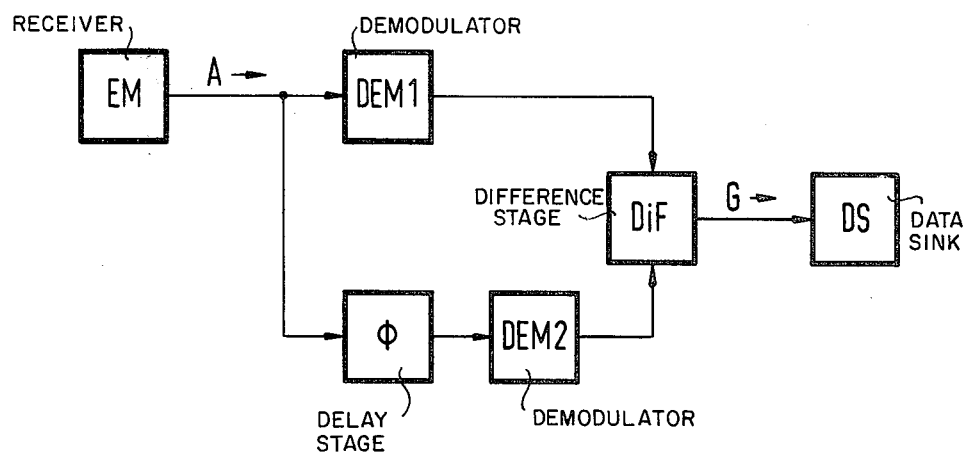
FIG. 2 is a block circuit diagram of a circuit arrangement for time-differential phase modulation.

FIG. 2 shows a circuit arrangement for time different phase modulation comprising demodulators DEM1, DEM2, a delay stage $\phi$, and a difference stage DIF. The receiver EM thus emits the phase-modulated signal A, and from the difference stage DIF the demodulated signal G is emitted to the data sink DS. The delay stage $\phi$ delays the signal A by one modulation section.

FIG. 3 shows a circuit arrangement for frequency-differential phase modulation comprising demodulators DEM1, DEM2, DEM3, DEM4 and of the difference stages DIF1, DIF2. The phase modulated signals A1, A2, A3, A4 possess different frequencies which are a multiple of a fundamental frequency $f$. Over the outputs of the difference stages DIF1 and DIF2, the demodulated signals G1 and G2 are fed to the data sinks DS1 and DS2.

FIG. 4 shows a fundamental circuit diagram of the demodulators DEM1, DEM2, DEM3, DEM4 which are schematically illustrated in FIG. 1, 2, and 3. This demodulator DEM comprises multiplier M, switching stage SCH, carrier generator TG, pulse generators IG1, IG2 and of the integrator INT. FIG. 4 also shows the references of the signals shown in FIG. 5. One demodulator DEM is provided for each carrier.

The multiplier M emits a multiplicative signal which corresponds to the product of the signal amplitudes supplied at its input. This multiplier M is supplied with analogue signals and emits an analogue, multiplicative signal. The multiplier M is supplied with the signal A of which an exemplary embodiment is shown in more detail in FIG. 5. In the simplest case such a phase-modulated signal A comprises a sinusoidal carrier which exhibits phase shifts at the times $t1$ and $t2$. Using such phase shifts the data are transmitted in known manner. The interval of time between the two phase shifts and the times $t1$ and $t2$ is referred to as modulation section $a$. The phase shifts occurring at times $t1$ and $t2$ in practice are generally accomplished over a longer period of time, although this is irrelevant to the present invention and therefore will not be discussed in detail.

In the pulse generator IG1 is produced the signal C which consists of a sequence of rectangular pulses. The pulse duration $c$ of these rectangular pulses is shorter than the modulation section $a$, and the phase state of these pulses is such that each of these pulses lies within one modulation section $a$. The duration $c$ of the pulses is equal to the reciprocal amount of the fundamental frequency $f$. Thus $c = 1/f$.

In the carrier generator TG there is produced a carrier which, in terms of its pulse repetition frequency and its phase state is identical to the carrier which is modulated in the transmitter S shown in FIG. 1. The synchronization of these two carriers is not the subject of the present invention and therefore will not be described in detail. The carrier produced in the carrier generator TG can be sinusoidal or rectangular. In the present case the carrier B has been assumed to be rectangular.

The transmission path between the carrier generator TG and the multiplier M contains the switching stage SCH which in the switching position shown in a solid line establishes a direct connection between the carrier generator TG and the multiplier M. When the switch shown in the switching stage SCH assumes the switching position represented in broken lines, the connection between the carrier generator TG and the multiplier M is broken. The switching stage SCH is controlled with the binary signal C. The two binary values of this signal C and also of the other binary signals are referenced 0 and 1. When the signal C=1, the solid switching position is set up, and when the signal C=0, the broken-line switching position of the switching stage SCH is set up. Thus the signal D is emitted via the output of the switching stage SCH to the multiplier M.

The multiplicative signal E, which corresponds to the produce of the signals A and D, is produced in the multiplier M. This multiplicative signal E is conducted to the integrator INT and is integrated, resulting in the signal G. The pulse generator IG2 produces the erasure signal F with the aid of which the integrated amounts are erased shortly after the times $t1$ and $t2$. Here $r1 - a - c/2$.

The integration time of the integrator INT is not determined by an analogue switch which could be arranged, for example, in the transmission channel between the multiplier M and the integrator INT. The integrator INT would carry out its integrating function during the time period $r2$. During the times $e1$ and $e2$ however the multiplicative signal E does not contain any integrable components so that in actual fact the integrating function is carried out only during the time $c$, i.e. during the duration of the pulses of the signal C.

Figure 6:
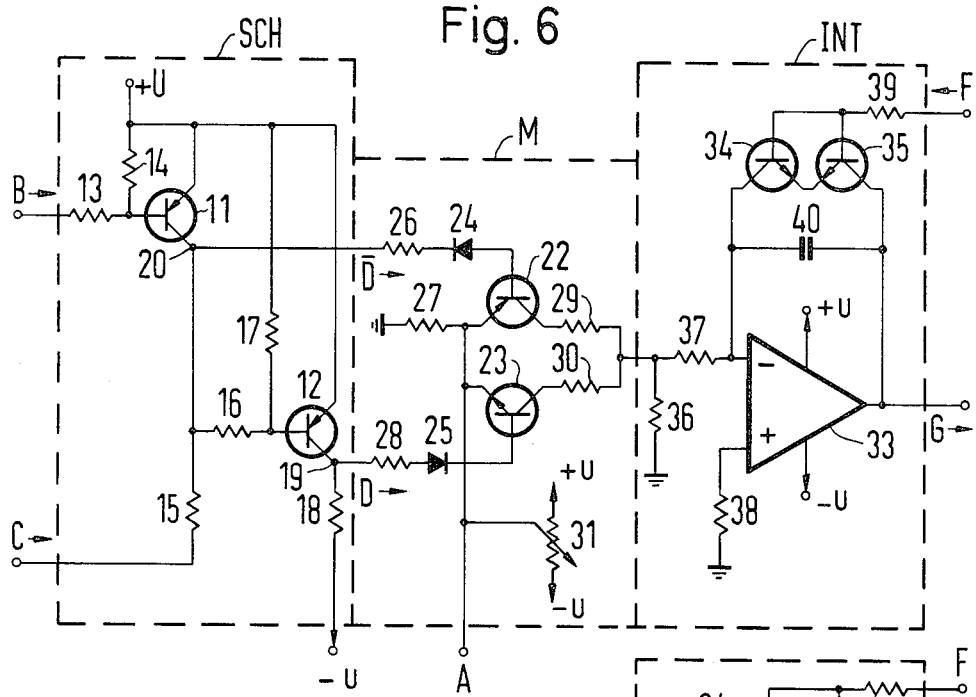
FIG. 6 is a schematic diagram of a preferred embodiment of a circuit arrangement for the demodulation of phase-modulated signals, in which the multiplier takes the form of a two parallel-connected, complementary transistors.

FIG. 6 illustrates preferred embodiments of the switching stage SCH, of the multiplier M and of the integrator INT. The switching stage SCH comprises transistors 11, 12 and of the resistors 13, 14, 15, 16, 17, 18. The multiplier M is fed via the circuit point 19 with the signal D and via the circuit point 20 with the inverted signal $\overline{D}$.

The multiplier M comprises two parallel-connected, complementary transistors 22, 23, diodes 24, 25 and resistors 26, 27, 28, 29, 30 and potentiometer 31. The transistors 22 and 23 act as double current switches which are controlled using the signals D and $\overline{D}$.

The integrator INT comprises operational amplifier 33, transistors 34, 35, resistors 36, 37, 38, 39 and charging capacitor 40. The voltages $+u$ and $-u$ are connected at several circuit points of the circuit illustrated in FIG. 6. These are the same voltages which are entered in FIG. 5 with respect to signal F. For the duration $r2$ of the signal F illustrated in FIG. 5 the charging capacitor 40 is charged, and for the duration $r1$ it is discharged via the emitter collector paths of the transistors 34 and 35.

The function of the switch SCH depicted in FIG. 6 was described with reference to FIG. 4, where it was stated that with the signal C=1 the switch SCH shown in FIG. 4 takes the position shown in solid lines. In that case the signals B and D are equal. We assume that a voltage −U allocated to the signal C=1 and a voltage +U is allocated to the signal C=0. Under this assumption four forms of operation can be distinguished.

A first form of operation occurs when the signal C=−U and B=+U, wherein transistor 11, operated as a switch, is non-conducting and the transistor 12, likewise operated as a switch, is conducting. In the case of the non-conducting transistor 11 the signal C equals the signal $\overline{D}$, and with C=−U, also D equals −U. The conducting transistor 12 causes a polarity reversal of the signal applied initially. With the signal C=−U, the signal D=+U is provided over terminal or switching point 19. Thus, in the first case, the signals B and D are equal, both equalling +U.

In a second case, the transistor 11 becomes conducting with C=−U and B=0 volt, whereas the transistor 12 becomes non-conducting. In the non-conducting transistor 12, the signal D=−U is provided over the switching point 19, whereas in the case of the conducting transistor 11 the signal $\overline{D}$=+U is provided from the switching point 20. Since a voltage of 0 volt of the signal B corresponds to the lower of the two binary values of the signal D in FIG. 5, in this second case, too, the signal B equal the signal D.

A third case occurs with the signal C=+U and B=+U, in which case both transistor 11 and 12 are non-conducting, so that with the signal C=+U the signal $\overline{D}$=+U is provided from the switching point 20 and the signal D=−U from the switching point 19. In this third case, the signals B and D are opposed to one another, as shown in FIG. 5 prior to the instant $t1$.

A fourth case occurs if with the signal C=+U the signal B=0 volt again renders non-conductive both transistors 11 and 12. As in the third case, we have the signals D=−U and $\overline{D}$=+U. Thus, in the third and fourth cases, the signal D=+U appears regardless of the binary value of the signal B. This is also apparent from FIG. 5, where prior to the instant $t1$ with the signal C=0 corresponding to the voltage +U the signal D takes the lower of the two binary values, regardless of whether the signal B takes the binary value +U or 0 volt prior to the instant $t1$.

Transistors 22 and 23 of the multiplier M operate as double-current switches which are controlled through the signal $\overline{D}$ or D. The diodes 24 and 25 serve, respectively, for the protection of the transistors 22 and 23. The diode 24 prevents the feeding of a positive voltage to the base of the transistor 22, and the diode 25 prevents the feeding of a negative voltage to the base of the transistor 23.

A first case can be distinguished wherein the signals D=+U and $\overline{D}$=−U are applied to the multiplier M. In this first case, the diode 24 and the transistor 22 are non-conducting, whereas the diode 25 and the transistor 23 are conducting. In this first case, the signal A is transmitted to the output of the multiplier M over the transistor 23 and resistor 30, whereby a "one" value is allocated to the signal D=+U. Thus, by multiplying the latter "one" value with the amplitude of the signal A one obtains the signal A.

A second case occurs when D=−U and $\overline{D}$=+U. In this second case, the two diodes 24 and 25, as well as the two transistors 22 and 23 are nonconducting. The signal E=0 volt is then provided at the output of the multiplier M, as shown in FIG. 5, throughout the duration of the lower of the two binary values of the signal D.

The signal F shown in FIG. 5 is applied to the integrator INT depicted in FIG. 6. The emitter-collector junctions of the transistors 34 and 35 are blocked with the signal F=−U, so that the capacitor 40 is charged throughout the duration of $r2$. Thus, during this time $r2$, an integration is performed by means of the operational amplifier 33 and the capacitor 44.

With the signal F=+U, the emitter-collector junctions of the transistors 34 and 35 become conducting so that the capacitor 40 is discharged throughout the duration $r1$. As shown in FIG. 5, the capacitor 40 is alternately discharged throughout the duration $r1$ and charged throughout the duration $r2$.

Figure 7:
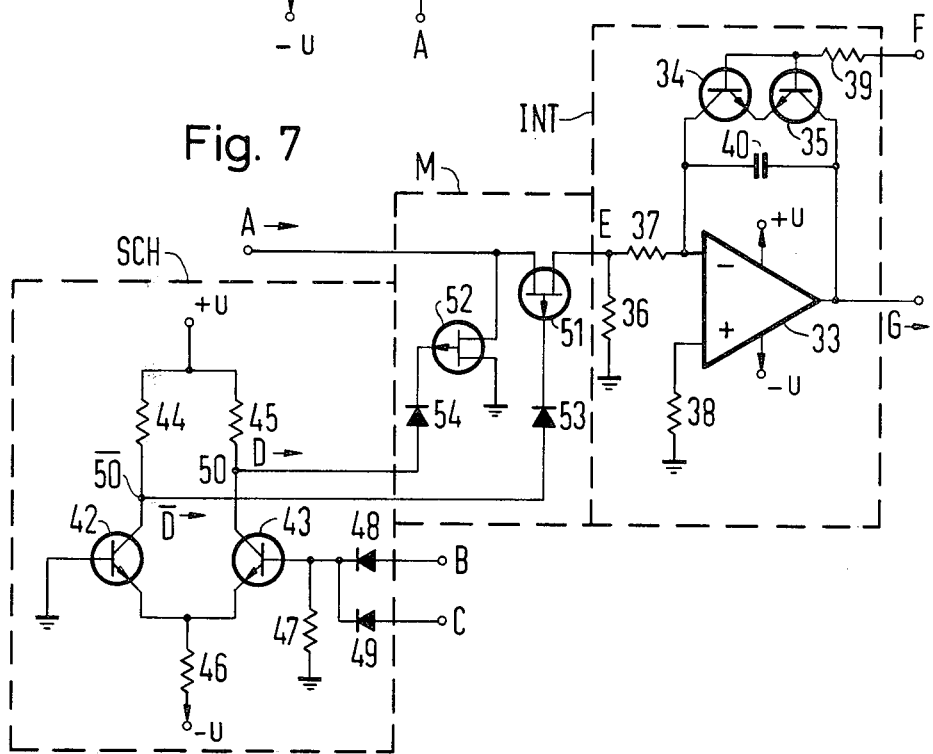
FIG. 7 is a schematic diagram of a preferred circuit arrangement for the demodulaton of phase-modulated signals in which field effect transistors are employed in the multiplier.

FIG. 7 shows further preferred embodiments of the switching stage SCH which is schematically illustrated in FIG. 4, of the multiplier M and of the integrator INT.

The switching stage SCH represented in FIG. 7 comprises transistors 42, 43, resistors 44, 45, 46, 47 and diodes 48 and 49. Via the circuit points 50 and $\overline{50}$, the signals D and $\overline{D}$, respectively, are emitted to the multiplier M.

In FIG. 7 the switch SCH causes the signals B and D to be equal to each other. Again, four forms of operation are possible.

With the signal C=1 corresponding to a voltage −U and with the signal B=+U we have a first case, wherein diode 48 is conducting, diode 49 is nonconducting, transistor 43 is conducting and the transistor 42 is non-conducting. A signal $\overline{D}$ is provided from the collector of the transistor 43 over the switching point $\overline{50}$, whereas a signal D is provided from the collector of the transistor 42 over the switching point 50. Thus, in this first case, the signal D=+U is provided over the switching point 50.

A second case occurs when signal C=−U and when signal B=0 volt, wherein the diodes 48 and 49 are non-conducting, the transistor 43 is nonconducting, and the transistor 42 conducting. In this second case, the signal D=0 volt is transmitted over the switching point 50, so that in the first and second cases the signals B and D are equal.

A third case occurs with the signals C=+U and B=+U, wherein the diodes 48 and 49 and the transistor 43 are conducting, and the transistor 42 is nonconducting.

A fourth case is obtained when signal C=+U and B=0 volt, wherein the diode 48 and the transistor 42 are non-conducting, and the diode 49 and the transistor 43 are conducting. In the third and fourth cases, the signal D=+U is provided over the switching point 50 regardless of whether the initially applied signal is B=+U or B=0 volt.

Field-effect transistors 51 and 52 of the multiplier M shown in FIG. 7 are controlled with the signals D and $\overline{D}$, respectively. Again, two cases can be distinguished.

A first case occurs when signal D=0 volt, wherein the diode 54 and the field-effect transistor 51 are conducting. Thus, the signal A is provided as signal E over the output of the multiplier M. This is a multiplication, wherein the value "one" is allocated to the signal D=0 volt, so that the product of the value "one" with the amplitude of the signal A is provided over the output of the multiplier M. In this first case, the diode 53 and the field-effect transistor 52 are non-conducting.

A second case occurs when signal D=+U, wherein the diode 54 and the field-effect transistor 51 are non-conducting, whereas the diode 53 and the field-effect transistor 52 are non-conducting. In this case, the signal A is blocked so that a signal of 0 volt is provided over the output of the multiplier M. The integrator INT shown in FIG. 7 is fully identical with the integrator already described and shown in FIG. 6, so that no further description is needed.

Circuit arrangements for the demodulaton of a phase modulated signal which are constructed in accordance with FIG. 6 and 7 are characterized by a large modulation range of the signal A. The amplitudes of the signal A are thus able to vary within a large amplitude range without any impairment of the demodulation.

The preferred embodiments described hereinabove are intended only to be exemplary of the principles of the invention. It is contemplated that the described embodiments can be modified or changed while remaining within the scope of the invention as defined by the appended claims.

I claim:

1. In apparatus in a receiver for demodulating a phase modulated signal, which signal is constituted by at least one carrier and a consecutive series of modulation section, wherein the received modulated signal is coupled to an analogue multiplier, the output of which is coupled to an integrator which emits a demodulated signal, the improvement comprising:
   first pulse generator means for producing a sequence of rectangular pulses, each of which occurs within a different one of said modulation sections, said pulses being of a duration equal to the reciprocal of the fundamental frequency of the carrier,
   means in the receiver for generating a local carrier signal corresponding in frequency with the carrier signal of said received modulated signal and in phase therewith, and
   switching means for connecting said local carrier signal to said multiplier, said switching means being operable to connect said local carrier signal to said multiplier responsive to the output of said pulse generator means,
   said multiplier producing an output having a value which is the product of said received carrier signal and said switched local carrier signal.

2. The improved apparatus defined in claim 1 further comprising:
   second pulse generator means for producing a sequence of rectangular erasure pulses, each of which occurs at the beginning of a said modulation section, each said pulse having a duration equal to less than half the difference between the duration of a said modulation section and the duration of a pulse from said first pulse generator means, the output of said second pulse generator being coupled to said integrator.

3. The improved circuit arrangement defined in claim 1 wherein said multiplier comprises:
   first and second complementary transistors,
   a first and second diodes connected, respectively, to conduct said switched local carrier signal to the bases of said first and second transistors,
   means connecting said received modulated signal to the emitters of said first and second transistors and
   first and second resistors connected, respectively, to the collectors of said first and second transistors and the output of said multiplier.

4. The improved apparatus defined in claim 1 wherein said switching means comprises:
   third and fourth transistors,
   means connecting said local carrier signal to the base of said third transistor,
   means connecting the output of said first pulse generator means to the base of said fourth transistor, and
   an operating voltage source having one polarity connected to the emitters of said third and fourth transistors and the other terminals connected to the collector of said fourth transistor,
   the portion of said local carrier signal permitted to pass through said switching means and the complement thereof appearing at, respectively the collectors of said third and fourth transistors.

5. The improved apparatus defined in claim 2 wherein said integrator comprises:
   operational amplifier means,
   charge storage means,
   a controllable switching path, and
   means connecting said charge storage means in series with said controllable switching path and input and output terminals of said operational amplifier means,
   said controllable switching path being rendered conductive by pulses from said second pulse generator means to discharge said charge storage means.

6. The improved apparatus defined in claim 1 wherein said multiplier comprises:
   first and second field effect transistors connected as current switches,
   third and fourth diodes for connecting said switched local carrier signal respectively, to the bases of said first and second field effect transistors, and
   means connecting said received modulated signal to one terminal of each of said field effect transistors, the produce of said received modulated signal and said switched local carrier signal being emitted by another electrode of said first field effect transistor.

7. The improved apparatus defined in claim 6 wherein said switching means comprises:
   fifth and sixth transistors each having a collector connected to a collector resistance and emitters connected to a common emitter resistance,
   an operating voltage source having one polarity connected to said collector resistances and the other polarity connected to said common emitter resistance and
   means for coupling said switched local carrier signals from said collector resistances to the bases of said field effect transistors.

* * * * *